United States Patent [19]

Wu

[11] Patent Number: 5,053,470
[45] Date of Patent: Oct. 1, 1991

[54] COPOLYMERS OF HEXAFLUOROISOBUTYLENE WITH VINYL ESTERS AND VINYL ALCOHOL

[75] Inventor: Chengjiu Wu, Morristown, N.J.

[73] Assignee: Allied-Signal, Inc., Morris Township, Morris County, N.J.

[21] Appl. No.: 594,912

[22] Filed: Oct. 9, 1990

[51] Int. Cl.$^5$ ............................................. C08F 14/18
[52] U.S. Cl. .................................. 526/253; 526/255; 525/60
[58] Field of Search .................... 526/255, 253; 525/60

[56] References Cited

U.S. PATENT DOCUMENTS

| | | | |
|---|---|---|---|
| 3,318,854 | 5/1967 | Honn et al. | 526/255 |
| 3,893,987 | 7/1975 | Chandrasekaran | 526/253 |
| 4,618,649 | 10/1986 | Ofstead | 525/60 |
| 4,851,472 | 7/1989 | Fawili et al. | 525/60 |

FOREIGN PATENT DOCUMENTS

| | | |
|---|---|---|
| 0150725 | 8/1985 | European Pat. Off. . |
| 61-148203 | 7/1986 | Japan ...................................... 525/60 |

OTHER PUBLICATIONS

"Vinyl Acetate and Vinyl Alcohol Copolymers with Tetrafluoroethylene", M. Modena et al., Eur. Polym. J. 3 (1967) p. 5.
"Copolymers of Vinyl Fluoride", A. Korin et al., J. Polym. Sci., Polym. Chem. Ed. 18 (1980), p. 109.
"A New High-Performance Fluoropolymer That Can Be Readily Melt Processed", P. S. Minhas et al., Plastics Engineering, 3 (1977) p. 60.
"A New Fluoropolymer with Unique Mechanical Properties", A. B. Robertson et al., SAMPE Tech. Conf. 18 (1986), p. 490.

Primary Examiner—Joseph L. Schofer
Assistant Examiner—N. Sarofim
Attorney, Agent, or Firm—Gerhard H. Fuchs; Ernest D. Buff

[57] ABSTRACT

Essentially alternating copolymers of hexafluoroisobutylene (HFIB) and vinyl acetate (VA) are prepared under homogeneous radial conditions. They are soluble in polar solvents such as ketones, dimethylforamide, and diglyme. Their solutions can be used to cast films and for coatings. They can be hydrolyzed to form copolymers of HFIB and vinyl alcohol (VOH).

13 Claims, 1 Drawing Sheet

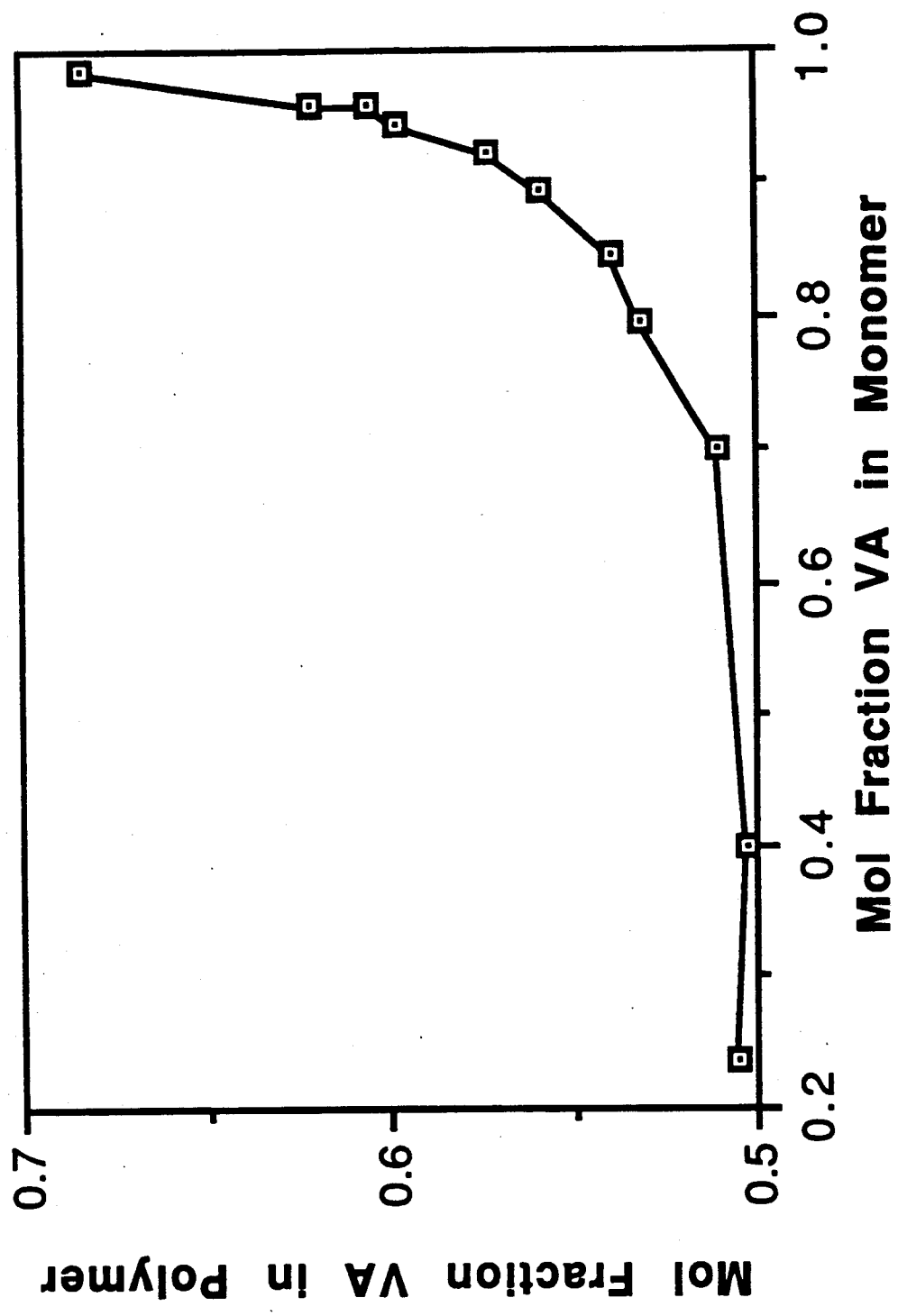

COPOLYMERS OF HEXAFLUOROISOBUTYLENE WITH VINYL ESTERS AND VINYL ALCOHOL

BACKGROUND OF THE INVENTION

The present invention provides copolymers of hexafluoroisobutylene (HFIB) and vinyl esters (VE), especially vinyl acetate (VA), which can be prepared under homogeneous radical conditions. They have a 1:1 alternate microstructure over a wide range of monomer feed ratios. The HFIB-VA alternating copolymer is amorphous, having a glass transition temperature of around 50° C.; it can be readily dissolved in various polar solvents such as ketones, dimethylformamide, and diglyme. The solutions can be used to make coatings and to cast films. These HFIB-VE copolymers can be hydrolyzed to form amorphous copolymers of HFIB and vinyl alcohol, or terpolymer of HFIB with VE and vinyl alcohol (HFIB-VOH copolymer and HFIB-VE-VOH terpolymer), which possess the desirable properties characteristic of fluoropolymers. They are soluble in many organic solvents, and strongly adherent to substrates.

There is a need for coating materials which have the superior properties of fluoropolymers—such as low refractive index and surface energy, excellent thermal and chemical resistance—and which at the same time meet the basic requirements for coatings, i.e. strong adhesion, hardness, toughness, abrasion resistance and liquid processability. Most known fluoropolymers do not not meet this combination of requirements; they do not dissolve easily in solvents for coating purposes, their adhesion to substrates is poor, and they are not as hard and abrasion-resistant as other conventional polymers such as acrylics or urethanes. The HFIB-based polymeric compositions of the present invention have the above-mentioned superior properties.

Vinyl esters have been previously copolymerized with certain reactive fluoroolefins such as tetrafluoroethylene, chlorotrifluoroethylene, and vinyl fluoride [M. Modena et al., Eur. Polym. J. 3 (1967), p.5; A. Korin et al J. Polym. Sci., Polym. Chem. Ed. 18 (1980), p.109].

An alternating copolymer of HFIB with vinylidene fluoride has been disclosed and is commercially available from Ausimont USA under the tradename CM-X [P. S. Minhas et al., Plastics Engineering, 3 1977, p.60; A. B. Robertson et al., SAMPE Tech. Conf. 18 (1986), p.490]. However, this copolymer is highly crystalline and is not known to dissolve in any solvent. A terpolymer containing 48% of HFIB, 44% of vinyl fluoride, and 10% of vinyl 4-hydroxybutyl ether has been recently disclosed [Europ. Pat. 150,725].

Among the various fluoroolefins, hexafluoroisobutylene [HFIB, 3,3,3-trifluoro-2-(trifluoromethyl)-prop-1-ene, hexafluoroisobutene, $(CF_3)_2C=CH_2$] is relatively new and less studied. From a structural point of view, polymers containing HFIB are interesting since the presence of two bulky trifluoromethyl pendant groups should provide excellent stability and properties characteristic of fluorine-containing polymers, such as low surface tension and refractive index. Unfortunately, HFIB monomer does not homopolymerize, and no basis is known for predicting which monomers can be copolymerized with HFIB.

SUMMARY OF THE INVENTION

In accordance with the present invention, there are provided novel soluble fluorinated copolymers by copolymerizing hexafluoroisobutylene (HFIB) with another monomer, i.e. certain vinyl esters, which contribute functionality and solubility. There are further provided liquid coating compositions which comprise solutions of such fluorinated copolymers.

The polymer product of this invention is a copolymer of HFIB with a vinyl ester of the formula $CH_2=CHOC(O)R$ wherein R is an alkyl group, straight chain, cyclic or branched, having 1 to 12 carbon atoms. Desirably, this copolymer comprises from about 30 to about 50 mol percent units derived from HFIB, and from about 50 to about 70 mol percent units derived from the vinyl ester, preferably from about 45 to about 50 mol percent units derived from HFIB, and from about 50 to about 55 mol percent units derived from the vinyl ester. The about equimolar copolymer has an essentially 1:1 alternating structure of units derived from HFIB and from the vinyl ester. Preferably, the vinyl ester is vinyl acetate.

The copolymer according to this invention may additionally contain —$CH_2$—CHOH— units derived from hydrolysis of vinyl ester-derived units in the HFIB-VE copolymer. Polymeric compositions containing such hydrolysis-generated units may contain from about 30 to about 50 mol percent units derived from HFIB, from about 0.5 to about 69.5 mol percent units derived from the vinyl ester, and from about 0.5 to about 69.5 mol percent of —$CH_2$—CHOH— units derived by hydrolysis of vinyl ester units, preferably from about 45 to about 50 mol percent units derived from HFIB, from about 0.5 to about 54.5 mol percent units derived from said vinyl ester, and from about 0.5 to about 54.5 mol percent of the —$CH_2$—CHOH— units.

It is, of course, possible to substantially completely hydrolyse the vinyl ester-derived units, so as to obtain copolymers having a backbone chain comprised of HFIB-derived units and —$CH_2$—CHOH— units. Such copolymers are within the contemplation of the present invention. They desirably contain from about 30 to about 50 mol percent units derived from HFIB, and from about 50 to about 70 mole percent —$CH_2$—CHOH— units, preferably from about 45 to about 50 mol percent units derived from HFIB, and from about 50 to about 55 mole percent —$CH_2$—CHOH— units. A particularly preferred embodiment of this type of copolymer comprises essentially alternating —$CH_2$—CHOH— units and units derived from HFIB.

The present invention further provides a method for making the above-described copolymers composed of HFIB and vinyl ester derived units, which involves polymerizing HFIB with a vinyl ester of the formula $CH_2=CHOC(O)R$—wherein R is an alkyl group, straight chain, cyclic or branched, having 1 to 12 carbon atoms—under free radical conditions, and recovering the resultant polymer from the polymerization mixture.

Lastly, there is provided a method for making the above-described terpolymers and copolymers which contain the —$CH_2$—CHOH— units, which involves hydrolyzing an above-described copolymer containing the HFIB and vinyl ester-derived units to totally or partially convert vinyl ester derived units to —$CH_2$—CHOH— units.

BRIEF DESCRIPTION OF THE DRAWING

The annexed drawing is a graphic presentation of the relationship between the monomer feed ratio and the copolymer composition obtained in free radical copolymerization of HFIB with vinyl acetate.

DETAILED DESCRIPTION OF THE INVENTION

The starting materials for the polymer compositions of the present invention are all well known, and can be produced using conventional methods. For example, the HFIB can be obtained by reacting hexafluoroacetone with ketene in a copper reactor at elevated temperature to form HFIB and carbon dioxide.

The vinyl ester starting materials are also known materials which are either readily available, or can be prepared using commercially available starting materials and employing conventional procedures. The vinyl esters have the general formula $CH_2=CHOC(O)R$ wherein R is an alkyl group, straight chain, cyclic or branched, having 1 to 12 carbon atoms, preferably 1 to 4 carbon atoms. Vinyl acetate is a specific example of a preferred species.

In general, the polymerization of the HFIB with the vinyl ester can be conducted in bulk, in solution, in aqueous suspension or dispersion, under pressure in a closed, stirred reaction vessel, using a free radical generating catalyst Suitable catalysts include the known acyl peroxide or azo type catalysts, such as azobis(isobutyronitrile) (AIBN) or 2,2-azobis(2,4-dimethyl-4-methoxyvaleronitrile). The polymerization temperature may range from about $-30°$ to about $+100°$ C. In particular, the copolymerization of HFIB with vinyl acetate can be performed under room temperature using an azo initiator such as azobis(isobutyronitrile) (AIBN) or 2,2-azobis(2,4-dimethyl-4-methoxyvaleronitrile) (Vazo-33 from du Pont), and can go to high conversion without suffering a significant change in copolymer composition, to form an amorphous copolymer which contains 20-50 mol% of HFIB This copolymer can readily be recovered from the reaction mixture by conventional procedures, such as filtration—after precipitation by addition of non-solvent, if necessary—followed by washing and drying, if desired. An amorphous and alternating copolymer of 1:1 HFIB and vinyl acetate can thus be prepared with great technological simplicity. The polymer product thus obtained is readily soluble in many organic solvents, especially polar solvents Exemplary suitable solvents include ketones, dimethylformamide and diglyme. The solutions can be used for casting film and for providing surface coatings having the advantageous properties of fluoropolymer coatings, in combination with good adhesion and abrasion resistance The ester group in the copolymer can be further hydrolyzed, partially or completely, to give an amorphous copolymer of HFIB, vinyl ester, and vinyl alcohol (VOH) Hydrolysis may be accomplished by subjecting the polymer, desirably in finely divided form or in solution, to treatment with caustic, such as sodium hydroxide or potassium hydroxide. Elevated temperatures are desirably employed to facilitate hydrolysis. Following hydrolysis treatment, the polymer is separated from the hydrolysis medium, and is washed, if desired.

The examples set forth below further illustrate the present invention and set forth the best mode presently contemplated for its practice.

EXAMPLES 1-11

These examples represent a series of low conversion polymerization experiments to determine the relationship between feedstock and copolymer composition. The polymerization of HFIB with VA was carried out under autogenous pressure in glass tubes equipped with Teflon (T.M) needle valves. Monomers were quantitatively introduced by vacuum transfer. The homogeneous polymerization was carried out in bulk at 30° C., using azobisisobutyronitrile (AIBN) as initiator. For 100 parts of the total monomer, 0.2 part of AIBN was used. The polymerization reaction was quenched by rapid cooling in liquid nitrogen. The polymer was collected and purified by precipitating it three times from a methylene chloride solution into methanol The polymer was analyzed by elemental and proton NMR procedures. The results are listed in Table 1, and are graphically depicted in the drawing.

TABLE 1

Monomer and Copolymer Compositions of HFIB-VA Copolymerization

| Example | $M_{VA}$ Feed (1) | Conversion (2) | M. W. $\times 10^6$ | Copolymer Comp. Mol fraction a (3) | b (4) |
|---|---|---|---|---|---|
| 1 | .9846 | 1.2 | 12.1 | .6830 | .678 |
| 2 | .9616 | 1.3 | 6.1 | .6203 | .620 |
| 3 | .9608 | 1.7 | 4.1 | .6047 | .606 |
| 4 | .9439 | 1.2 | 4.9 | .5970 | .596 |
| 5 | .9227 | 1.3 | 8.8 | .5731 | .575 |
| 6 | .8947 | 0.8 | 6.4 | .5588 | .562 |
| 7 | .8467 | 0.7 | 4.9 | .5389 | .541 |
| 8 | .7965 | 1.0 | 8.9 | .5312 | .537 |
| 9 | .7022 | 0.6 | 7.9 | .5109 | .523 |
| 10 | .3982 | 7.6 | 7.8 | .5028 | .508 |
| 11 | .2363 | 1.6 | 8.4 | .5051 | .504 |

(1) Mol fraction of VA in monomer feed.
(2) Weight % of total monomer feed.
(3) Mol fraction of VA in copolymer, from elemental analysis.
(4) Mol fraction of VA in copolymer, from NMR analysis.

EXAMPLE 12

This example illustrates low conversion solution polymerization. The polymerization of HFIB with VA was carried out under autogenous pressure in a glass tube equipped with Teflon needle valves. Monomers were quantitatively introduced by vacuum transfer The homogeneous polymerization was carried out in 1,1,3-trichlorotrifluoroethane at 30° C. with a ratio of total monomer to solvent of 20:80, using 0.2 part of azobisisobutyronitrile (AIBN) as initiator. The polymer was treated in the same manner as in Examples 1-11. The results are listed in Table 2, which also includes the results of Example 10 (bulk polymerization, described above) for comparative purposes.

EXAMPLE 13

This example illustrates low temperature solution polymerization. The polymerization of HFIB with VA was carried out under autogenous pressure in a glass tube equipped with Teflon needle valves. Monomers were quantitatively introduced by vacuum transfer. The homogeneous polymerization was carried out in 1,1,3-trichlorotrifluoroethane at 0° C. with a ratio of total monomer to solvent of 20:80, using 0.4 part of trichloroacetyl peroxide (TCAP) as initiator. The polymer was treated in the same manner as in Examples 1-11. The result is shown in Table 2.

TABLE 2

Effect of Reaction Condition

| Example | Polym. cond. | $M_{VA}$ Feed | M.W. $\times 10^5$ (1) | Tg °C. | Mol Fract. VA in Polymer |
|---|---|---|---|---|---|
| 10 | 30° C. bulk (2) | 0.4 | 7.8 | 46 | 0.508 |
| 12 | 30° C. soln. (3) | 0.40 | 6.7 | 44 | 0.508 |
| 13 | 0° C. soln. (4) | 0.40 | 13.6 | 62 | 0.513 |

(1) Measured by light scattering in THF.
(2) In bulk, using 0.2% AIBN as initiator.
(3) In 20% 1,1,3-trichloro-trifluoroethane solution, using 0.2% Vazo-33 as initiator.
(4) In 20% 1,1,3-trichloro-trifluoroethane solution, using 0.4% TCAP as initiator.

EXAMPLE 14

This example illustrates solution polymerization. The polymerization of HFIB with VA was carried out in 1,3,3-trichlorotrifluoroethane at 30° C. for 16 hours. To a glass aerosol reactor were added 80 parts of 1,1,3-trichlorotrifluoroethane, 14.7 parts of HFIB, 5.3 parts of VA, and 0.04 part of 2,2-azobis(2,4-dimethyl-4-methoxyvaleronitrite (Vazo-33). The polymer was precipitated with methanol and purified by precipitating it twice from a methylene chloride solution into methanol. The copolymer weighed 12.4 parts (62% yield), contained 50 mol % of HFIB monomer units, had a weight average molecular weight of 650,000 and a Tg of 45° C.

EXAMPLE 15

This example illustrates hydrolysis of HFIB-VA copolymer to HFIB-VOH copolymer. To a solution of 10 parts HFIB-VA copolymer obtained from Example 14 in 100 parts of tetrahydrofuran was added slowly a solution of 4 parts of potassium hydroxide in 50 parts of tetrahydrofuran. After the exothermic reaction was over, the mixture was brought to reflux for 1.5 hours. The mixture was then filtered and poured into 1000 parts of water. The polymer was collected and purified by precipitating it three times from a tetrahydrofuran solution into water. The dried polymer, a 1:1 HFIB-VOH copolymer, was obtained in 9.1 parts. No residual acetoxy groups were detected by NMR. The weight average molecular weight of the copolymer was 485,000 and the Tg was 89° C.

While example 15 illustrates substantially complete hydrolysis of all VA groups to the corresponding VOH groups, it should be clear that any desired lesser degree of hydrolysis can be obtained by appropriately modifying reactant ratios, reaction temperatures and reaction times, so as to obtain polymer compositions of this invention containing any desired VA/VOH ratio.

EXAMPLE 16

This example illustrates preparation of a HFIB-VA polymer coating on a silicon surface. A solution of 0.6 part of HFIB-VA copolymer as prepared according to Example 14 in 3.4 parts of butylacetate was spin coated onto a silicon surface to give a coating of 0.08 mm thickness. The residual solvent was removed in an oven by baking at 80° C. for 20 minutes. The adhesion of the surface coating to substrate was strong and the refractive index was 1.405.

EXAMPLE 17

This example illustrates preparation of a HFIB-VOH polymer coating on a silicon substrate. A solution of 0.6 part of HFIB-VOH copolymer, prepared as illustrated in Example 15, in 3.4 parts of diglyme was filtered through a 0.2 micron membrane filter and spin coated onto a silicon surface to give a coating of about 0.08 mm thickness. The residual solvent was removed by baking in an oven at 80° C. for 20 minutes. The adhesion of the surface coating to substrate was strong and the refractive index was 1.396.

The above-described coatings are useful for any of the purposes for which flouropolymer coatings are conventionally employed, such as non-stick surface coating and low friction surface coatings.

Since various changes may be made in the invention without departing from its spirit and essential characteristics, it is intended that all matter contained in the description shall be interpreted as illustrative only and not in a limiting sense, the scope of the invention being defined by the appended claims.

I claim:

1. A copolymer of hexafluoroisobutylene with a vinyl ester of the formula $CH_2=CHOC(O)R$ wherein R is an alkyl group, straight chain, cyclic or branched, having 1 to 12 carbon atoms.

2. A copolymer according to claim 1 comprising from about 30 to about 50 mol percent units derived from hexafluoroisobutylene and from about 50 to about 70 mol percent units derived from said vinyl ester.

3. A copolymer according to claim 1 comprising from about 45 to about 50 mol percent units derived from hexafluoroisobutylene, and from about 50 to about 55 mol percent units derived from said vinyl ester.

4. A copolymer according to claim 3 comprising essentially 1:1 alternating units derived from hexafluoroisobutylene and from said vinyl ester.

5. A copolymer according to any one of claims 1 through 4 wherein said vinyl ester is vinyl acetate.

6. A copolymer according to claim 1 additionally comprising —$CH_2$—CHOH— units derived from said vinyl ester.

7. A copolymer according to claim 6 comprising from about 30 to about 50 mol percent units derived from hexafluoroisobutylene from about 0.5 to about 69.5 mol percent units derived from said vinyl ester, and from about 0.5 to about 69.5 mol percent of —$CH_2$—CHOH— units derived from said vinyl ester.

8. A copolymer according to claim 6 comprising from about 45 to about 50 mol percent units derived from hexafluoroisobutylene from about 0.5 to about 54.5 mol percent units derived from said vinyl ester, and from about 0.5 to about 54.5 mol percent —$CH_2$—CHOH— units derived from said vinyl ester.

9. A copolymer according to any one of claims 6 through 8 wherein said vinyl ester is vinyl acetate.

10. A copolymer having a backbone chain comprised of hexafluoroisobutylene derived units and —$CH_2$—CHOH— units.

11. A copolymer according claim 10 comprising from about 30 to about 50 mol percent units derived from hexafluoroisobutylene, and from about 50 to about 70 mole percent —$CH_2$—CHOH— units.

12. A copolymer according claim 10 comprising from about 45 to about 50 mol percent units derived from hexafluoroisobutylene, and from about 50 to about 55 mole percent —$CH_2$—CHOH— units.

13. A copolymer according to claim 11 comprising essentially alternating —$CH_2$—CHOH— units and units derived from HFIB.

* * * * *